US012762462B2

(12) United States Patent
Guo et al.

(10) Patent No.: US 12,762,462 B2
(45) Date of Patent: Oct. 13, 2026

(54) MONTE CARLO SIMULATION FRAMEWORK THAT PRODUCES ANOMALY-FREE TRAINING DATA TO SUPPORT ML-BASED PROGNOSTIC SURVEILLANCE

(71) Applicant: Oracle International Corporation, Redwood Shores, CA (US)

(72) Inventors: Beiwen Guo, Redwood City, CA (US); Matthew T. Gerdes, Oakland, CA (US); Guang C. Wang, San Diego, CA (US); Hariharan Balasubramanian, Redmond, WA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1099 days.

(21) Appl. No.: 17/370,388

(22) Filed: Jul. 8, 2021

(65) Prior Publication Data

US 2022/0391754 A1 Dec. 8, 2022

Related U.S. Application Data

(60) Provisional application No. 63/196,328, filed on Jun. 3, 2021.

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
CPC ........................................................ G06N 5/04
See application file for complete search history.

(56) References Cited

U.S. PATENT DOCUMENTS

| | | | | |
|---|---|---|---|---|
| 5,223,207 A * | 6/1993 | Gross | G21C 17/00 | 376/217 |
| 5,764,509 A * | 6/1998 | Gross | G05B 23/0254 | 706/45 |
| 7,292,952 B1 * | 11/2007 | Gross | G06F 11/3096 | 702/182 |

(Continued)

OTHER PUBLICATIONS

NPL Brownlee How to Remove Outliers for Machine Learning 2020.*

(Continued)

*Primary Examiner* — Paul M Knight
(74) *Attorney, Agent, or Firm* — Kilpatrick Townsend & Stockton LLP

(57) ABSTRACT

The disclosed embodiments relate to a system that produces anomaly-free training data to facilitate ML-based prognostic surveillance operations. During operation, the system receives a dataset comprising time-series signals obtained from a monitored system during normal, but not necessarily fault-free operation of the monitored system. Next, the system divides the dataset into subsets. The system then identifies subsets that contain anomalies by training one or more inferential models using combinations of the subsets, and using the one or more trained inferential models to detect anomalies in other target subsets of the dataset. Finally, the system removes any identified subsets from the dataset to produce anomaly-free training data.

17 Claims, 12 Drawing Sheets

(56) References Cited

U.S. PATENT DOCUMENTS

| | | | | |
|---|---|---|---|---|
| 8,700,550 | B1 * | 4/2014 | Bickford | G06N 20/00<br>706/14 |
| 10,740,634 | B1 * | 8/2020 | Katsuki | G06F 18/256 |
| 11,082,369 | B1 * | 8/2021 | Liu | G06F 40/35 |
| 2017/0372214 | A1 * | 12/2017 | Peng | G06F 17/18 |
| 2018/0225593 | A1 * | 8/2018 | Cozine | G06Q 30/0278 |
| 2018/0330069 | A1 * | 11/2018 | Quinn | G10L 15/22 |
| 2019/0130101 | A1 * | 5/2019 | Chen | G06N 3/048 |
| 2019/0156206 | A1 * | 5/2019 | Graham | G06N 3/08 |
| 2019/0378022 | A1 * | 12/2019 | Wang | G06F 17/18 |
| 2020/0374720 | A1 * | 11/2020 | Li | G06N 20/20 |
| 2021/0383261 | A1 * | 12/2021 | Hanna | G06N 5/04 |
| 2022/0058172 | A1 * | 2/2022 | John | G06N 3/044 |
| 2022/0383156 | A1 * | 12/2022 | Harsola | G06N 5/04 |

OTHER PUBLICATIONS

NPL Cazenave Nested Monte Carlo Search 2009.*
NPL Cheng Multivariate State Estimation Technique for Remaining Useful Life Prediction 2007.*
NPL Cretu Casting out Demons Sanitizing Training Data for Anomaly Sensors 2008.*
NPL Cui a Sequential Monte Carlo Approach to Anomaly Detection 2007.*
NPL Gkioulekas Optimisation based approaches for ML 2020.*
NPL Gross AI Decision Support Prognostics for IoT Asset Health Monitoring 2019.*
NPL Hines USNRC Technical Review of On Line Monitoring 2008.*
NPL Hong Data Preprocessing and Data Modeling 2005.*
NPL Khalid Algorithmic Splitting a Method for Dataset Preparation 2016.*
NPL Lv Early fault detection method for induced draft fans based on MSET 2020.*
NPL Nowak Statistical Signal Processing U Wisconsin ECE 830 Fall 2011.*
NPL Patro Cross Validation K Fold vs Monte Carlo Jan. 2021.*
NPL Shrivastava Cross Validation in Time Series 2020.*
NPL SPlit Roshan an Optimal Method for Data Splitting Jun. 1, 2021.*
NPL Wang Autonomous Anomaly Detection for Dense Sensor IoT Prognostics Mar. 2020.*
NPL Wang ContainerStress Autonomous Cloud Node Scoping Framework.*
NPL Arpit Isolation Forest algorithm for anomaly detection 2020.*
NPL Ezeme Dream Deep Recursive Attentive Model for Anomaly Detection 2019.*
NPL Akouemo Data Improving in Time Series using ARX and ANN 2017.*
NPL Tae Data Cleaning for Accurate Fair and Robust Models 2019.*
NPL Zhang Time Series Data Cleaning 2017.*
NPL Maleki Unsupervised Anomaly Detection Apr. 2021.*
NPL Pang Deep Learning for Anomaly Detection 2020.*

* cited by examiner

MONTE CARLO SIMULATION FRAMEWORK THAT PRODUCES ANOMALY-FREE TRAINING DATA TO SUPPORT ML-BASED PROGNOSTIC SURVEILLANCE

RELATED APPLICATION

This application claims priority under 35 U.S.C. § 119 to U.S. Provisional Application No. 63/196,328, entitled "Comprehensive Monte Carlo Simulation Framework for Support of Multivariate Anomaly Detection for Use Cases with No 'Service Request' Historical Logs for Monitored Assets" by inventors Beiwen Guo, et al., filed on 3 Jun. 2021, the contents of which are incorporated by reference herein.

BACKGROUND

Field

The disclosed embodiments generally relate to techniques for using machine-learning (ML) models to perform prognostic-surveillance operations based on time-series sensor signals from monitored assets. More specifically, the disclosed embodiments relate to a Monte Carlo simulation framework that produces anomaly-free training data to support ML-based prognostic surveillance operations.

Related Art

Large numbers of sensors are presently being deployed to monitor the operational health of critical assets in a large variety of business-critical systems. For example, a medium-sized computer data center can include over 1,000,000 sensors monitoring thousands of servers, a modern passenger jet can include 75,000 sensors, an oil refinery can include over 1,000,000 sensors, and even an ordinary car can have over 100 sensors. These sensors produce large volumes of time-series sensor data, which can be used to perform prognostic-surveillance operations to facilitate detecting incipient anomalies. This makes it possible to take remedial action before the incipient anomalies develop into failures in the monitored assets.

ML-based prognostic-surveillance techniques typically operate by training an ML model (also referred to as an "inferential model") to learn correlations among time-series signals. The trained ML model is then placed in a surveillance mode where it is used to predict values for time-series signals based on the correlations with other time-series signals, wherein deviations between actual and predicted values for the time-series signals trigger alarms that indicate an incipient anomaly. This makes it possible to perform remedial actions before the underlying cause of the incipient anomaly leads to a catastrophic failure.

ML-based prognostic-surveillance techniques operate by learning patterns in undegraded training data, which is obtained when no degradation is present in the monitored assets, and subsequently detecting anomalies in those patterns during normal system operation. Note that this undegraded training data is not necessarily pristine data from a brand new asset; it is data from an asset for which a subject-matter expert (SME) has determined that no degradation modes were active during the time of training data collection.

However, if it is not possible to obtain input from SMEs about the condition of an asset, then an alternative way of obtaining undegraded training data is to cross-reference data historian telemetry archives with service record log files. Note that service record log files can be used to quickly identify time periods during which assets were reported to be degraded or failed, and time periods when the assets were repaired, replaced, or refurbished. This information can be used to remove periods with known degradation conditions from the data historian signals, so the remaining anomaly-free data can be used to train an inferential model. Note that if anomalous data is not removed from the training data, then whatever anomalous behavior is present during acquisition of the training data can lead to missed alarms during subsequent prognostic-surveillance operations.

However, in many use cases, service record log files are not available and SME labeling of historical telemetry data is difficult to obtain or is unavailable. This presents a challenge, because existing techniques for inferring the presence of anomalies in unlabeled training data are "outlier based." For example, if time-series signals include bursts of activity that shoot up (or drift up) to exceed three-sigma from the mean, the bursts of activity can be labeled as anomalous. In another example, when physical parameters reach values that are physically impossible to attain, the values indicate the presence of anomalies (e.g., when a "remaining fuel" parameter indicates negative gallons, etc.).

The problem with using "outlier detection" schemes is that the majority of anomalies that lead to asset failures are not actually "outliers," but are instead referred to as "inliers." Inliers are anomalous patterns that are inside the expected data range for time-series telemetry signals. For example, a sensor might die or a component in a monitored asset might fail without causing associated time-series sensor signals to become outliers.

Hence, what is needed is a technique for producing anomaly-free training data that does not suffer from the above-described shortcomings of existing techniques.

SUMMARY

The disclosed embodiments relate to a system that produces anomaly-free training data to facilitate ML-based prognostic surveillance operations. During operation, the system receives a dataset comprising time-series signals obtained from a monitored system during normal, but not necessarily fault-free operation of the monitored system. Next, the system divides the dataset into subsets. The system then identifies subsets that contain anomalies by training one or more inferential models using combinations of the subsets, and using the one or more trained inferential models to detect anomalies in other target subsets of the dataset. Finally, the system removes any identified subsets from the dataset to produce anomaly-free training data.

In some embodiments, while removing identified subsets from the dataset, the system asks a subject-matter expert whether the identified subsets contain anomalies, and then removes identified subsets that the subject-matter expert confirms contain anomalies.

In some embodiments, training the one or more inferential models using combinations of the subsets involves training an inferential model for every possible combination of the subsets.

In some embodiments, while using the one or more trained inferential models to detect anomalies in the target subsets, the system uses the one or more trained inferential models to perform prognostic-surveillance operations on the target subsets, and then identifies target subsets that contain anomalies based on a number of alerts produced during the prognostic-surveillance operations.

In some embodiments, the process of dividing the dataset into subsets and identifying the subsets that contain anomalies is an iterative process, which starts with fewer larger subsets and progresses to a larger number of smaller subsets, thereby making it possible to determine that no anomalies exist based on fewer subsets without having to analyze a large number of possible combinations of smaller subsets.

In some embodiments, the system additionally uses the anomaly-free training data to train an inferential model during a training mode. Next, during a subsequent surveillance mode, the system: uses the trained inferential model to generate estimated values for the time-series signals received from the monitored system based on cross-correlations between the time-series signals; performs pairwise differencing operations between actual values and the estimated values for the time-series signals set to produce residuals; and analyzes the residuals to detect the incipient anomalies in the monitored system.

In some embodiments, while analyzing the residuals, the system performs a sequential probability ratio test (SPRT) on the residuals to produce SPRT alarms, and then detects the incipient anomalies based on the SPRT alarms.

In some embodiments, the inferential model comprises a multivariate state estimation technique (MSET) model.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Exemplary Prognostic-Surveillance System

Figure 1:
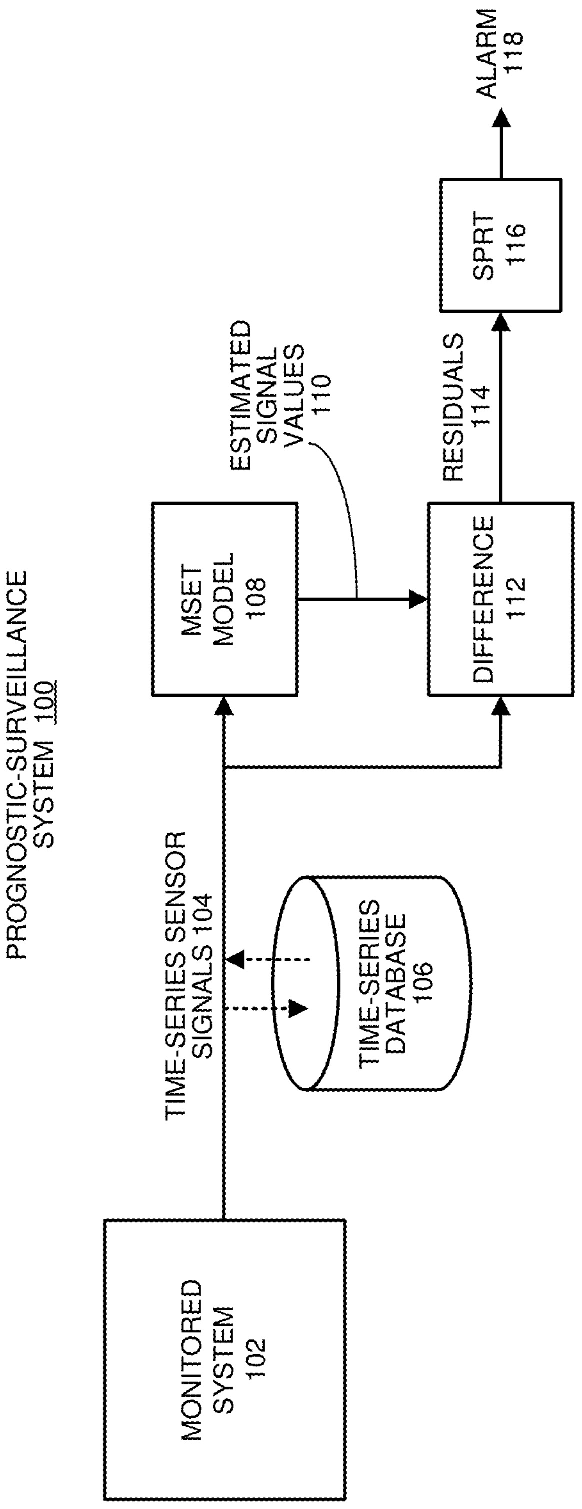
FIG. 1 illustrates an exemplary prognostic-surveillance system in accordance with the disclosed embodiments.

Before describing the adaptive prognostic-surveillance system further, an exemplary non-adaptive MSET-based prognostic-surveillance system is first described. FIG. 1 illustrates an exemplary non-adaptive prognostic-surveillance system 100 that accesses a time-series database 106, containing time-series signals in accordance with the disclosed embodiments. As illustrated in FIG. 1, prognostic-surveillance system 100 operates on a set of time-series sensor signals 104 obtained from sensors in a monitored system 102. Note that monitored system 102 can generally include any type of machinery or facility, which includes sensors and generates time-series signals. Moreover, time-series signals 104 can originate from any type of sensor, which can be located in a component in monitored system 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from monitored system 102 or from time-series database 106 into a multivariate state estimation technique (MSET) pattern-recognition model 108. Although it is advantageous to use an inferential model, such as MSET, for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics.* 16 (2): 117-186.) In this way, prognostic-surveillance system 100 can proactively alert system operators to incipient anomalies, such as impending failures, hopefully with enough lead time so that such problems can be avoided or proactively fixed.

Figure 2:
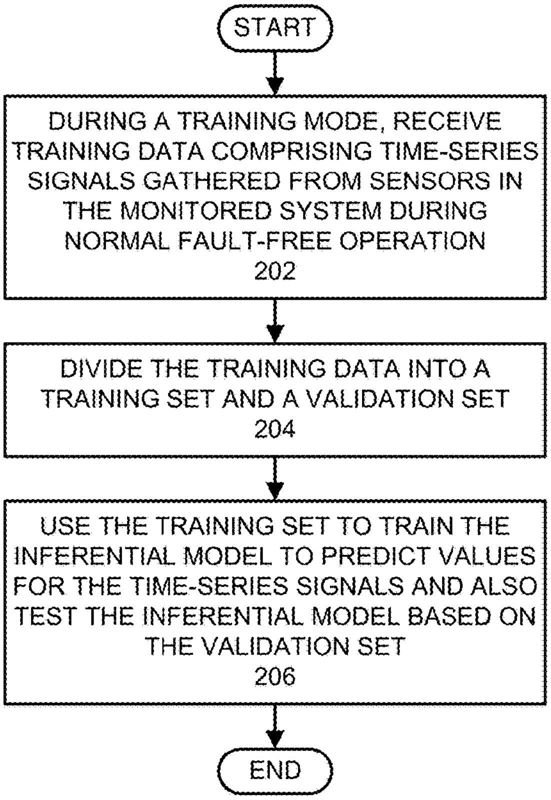
FIG. 2 presents a flow chart illustrating a process for training an inferential model in accordance with the disclosed embodiments.
Figure 3:
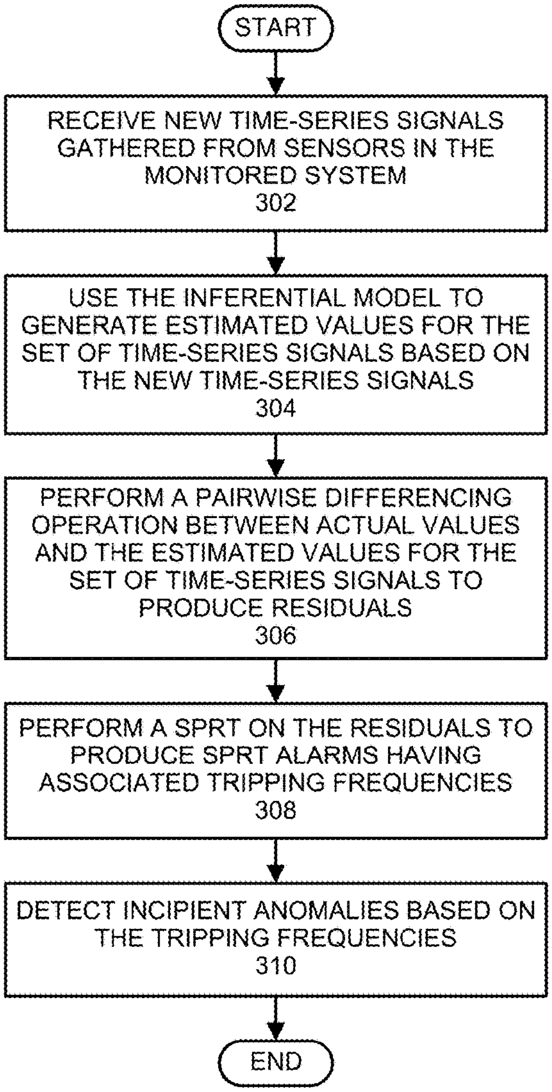
FIG. 3 presents a flow chart illustrating a process for using an inferential model to perform prognostic-surveillance operations in accordance with the disclosed embodiments.

The prognostic surveillance system 100 illustrated in FIG. 1 operates generally as follows. During a training mode, which is illustrated in the flow chart in FIG. 2, the system receives a training set comprising time-series signals gathered from sensors in the monitored system under normal fault-free operation (step 202). Next, the system divides the training data into a training set and a validation set (step 204). The system then trains the inferential model to predict values of the time-series signals based on the training set, and also tests the inferential model based on the validation set (step 206). During a subsequent surveillance mode, which is illustrated by the flow chart in FIG. 3, the system receives new time-series signals gathered from sensors in the monitored system (step 302). Next, the system uses the inferential model to generate estimated values for the set of time-series signals based on the new time-series signals (step 304). The system then performs a pairwise differencing operation between actual values and the estimated values for the set of time-series signals to produce residuals (step 306). The system then analyzes the residuals to detect the incipient anomalies in the monitored system. This involves performing a SPRT on the residuals to produce SPRT alarms with associated tripping frequencies (step 308), and then detecting incipient anomalies based on the tripping frequencies (step 310). Note that these incipient anomalies can be associated with an impending failure of the monitored system, or a malicious-intrusion event in the monitored system.

Overview

A comprehensive Monte Carlo simulation technique has been developed, which identifies and removes anomalies from a dataset comprised of time-series signals to produce training data to facilitate ML-based prognostic-surveillance operations. This technique considers possible subsets of the dataset, aggregates all permutations of those subsets into training sets and testing sets, and systematically identifies one, two, or multiple anomalies. In doing so, this new technique autonomously discovers all types of anomaly signatures, including heretofore undiscoverable "inlier" anomalies in unlabeled training data. This technique is able to detect a wide range of "anomaly classes" (both outliers and inliers) in circumstances where various permutations and combinations of anomaly types are applied to individual signals or multiple signals.

Types of Anomalies

Common classes of "inlier" anomalies are now described. As mentioned above, the problem with existing "data cleansing" techniques that use "outlier detection" schemes to identify and remove anomalies from training data is that the majority of anomalies that cause asset downtime and lead to failures, are not actually "outliers," but are instead what we call "inliers." Inliers are anomalous patterns that are inside the data range (minimum to maximum) for the time-series telemetry. The most insidious types of inliers are those that are not only inside the range spanned by one or more variables under surveillance, but are also "inside the noise band."

A common type of inlier failure is a sensor failure. Note that if a sensor completely fails and its corresponding signal disappears, this type of failure is easy to detect. Moreover, if a signal simply disappears, most pattern-recognition techniques will stop functioning and report an error. Another type of sensor failure that is typically difficult to detect with threshold-based techniques is where a sensor transducer dies and reports its last mean value, but is no longer responding to the sensed physical parameter.

Another type of inlier anomaly that is difficult to detect with threshold-based detection techniques is slow degradation modes where the degradation stays below a noise floor for days, weeks, or months before breaking out above the noise floor to enable a conventional outlier-detection technique to detect the anomaly. Examples of this type of slow degradation mode anomaly include: gradual decalibration bias in a sensor; core voltage drift in a server motherboard caused by processor substrate warpage; thermal issues from gradual dust fouling of air intake filters and/or heat sink fins; fan motor degradation from bearing out-of-roundness; gradual lubrication dry-out and/or lubrication contamination with dust; age-related wear-out of motor and/or gearbox internals; rotator-shaft radial imbalance mechanisms in motors, generators or/turbines; surface contamination on impeller vanes on centrifugal pumps, fans or turbines; gradual leaks in electrolytic capacitors; electromigration phenomena in PCB substrates; mechanical interconnect fretting; and the appearance of new acoustic or vibrational spectral components in the presence of noisy background spectra.

An MSET-based prognostic technique can be used to detect a slow degradation mode anomaly, wherein a flow signal starts to gradually deteriorate at day zero. Although this type of "inlier" anomaly would not be detectable by conventional "outlier detection" techniques because it is smaller than the normal variance on the signal, empirical results have shown that an MSET-based prognostic-surveillance technique is able to detect the anomaly when the degradation is only 0.06% of the signal, and is well within the noise band.

Another class of insidious inlier anomaly is what instrumentation specialists call "change-in-gain-without-a-change-in-mean" failures, or simply "loss-of-gain" failures. This is where a physical transducer gradually stops responding to the physical parameter it is sensing. Note that an MSET-based prognostic technique can be used to detect this type of loss-of-gain anomaly. A number of catastrophic events have been traced to this type of "inlier" degradation mode. For example, there have been three oil refinery explosions in the past 25 years that were root-caused to "loss-of-gain" failures in oxygen sensors. In this type of failure, the oxygen level gradually creeps up, but the oxygen sensor is degraded and does not reflect the increasing oxygen level until it hits a critical level and causes an explosion.

Monte Carlo Simulation Framework

Figure 4:
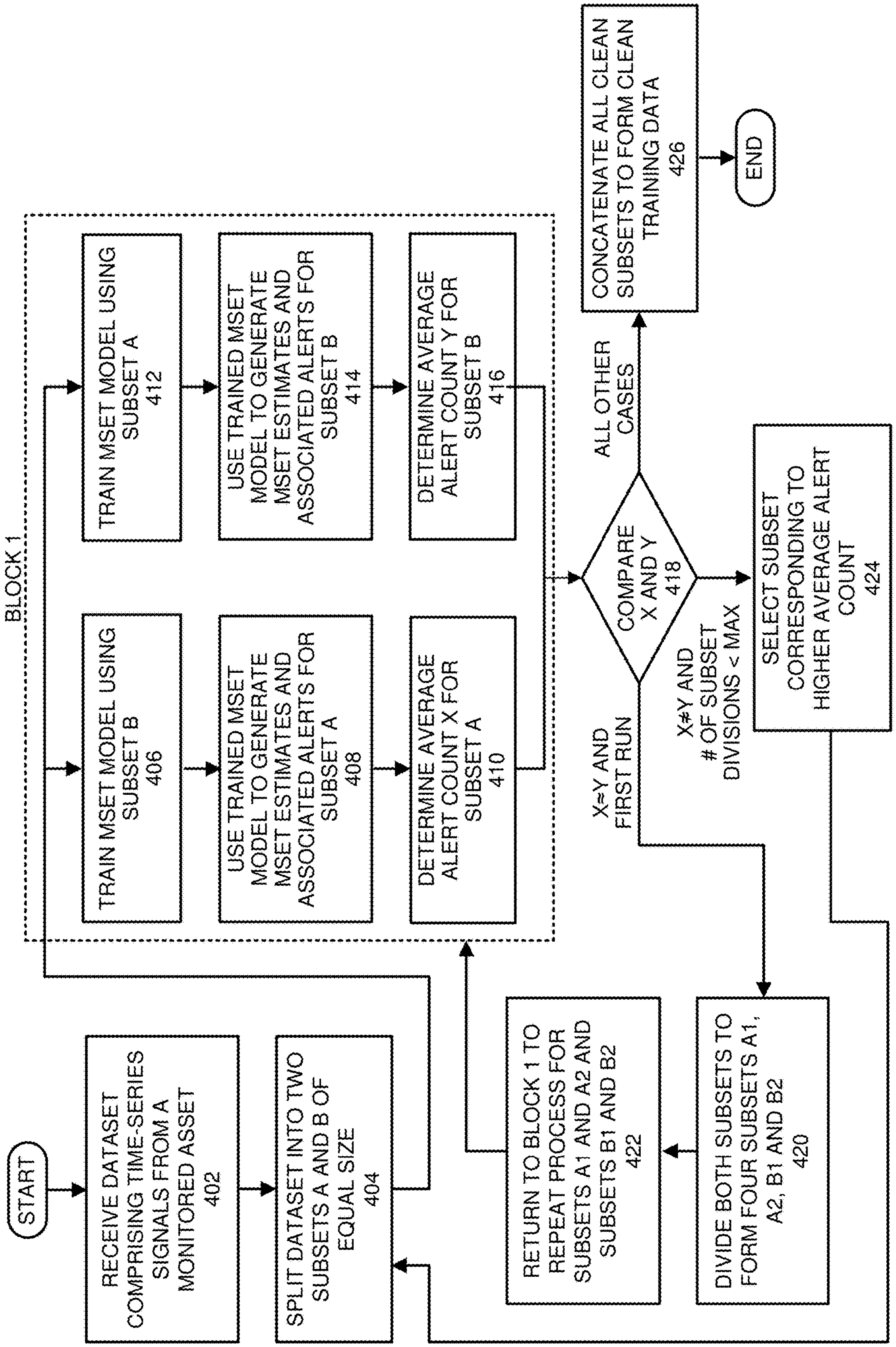
FIG. 4 presents a flow chart illustrating the process of producing anomaly-free training data in accordance with the disclosed embodiments.

FIG. 4 presents a flow chart illustrating how our Monte Carlo simulation framework operates. The system first receives a dataset comprising time-series signals from a monitored asset (step 402) and splits the dataset into two subsets A and B of equal size (step 404). Next, the system proceeds to block 1 to train an MSET model on subset B (step 406) and uses the trained MSET model to generate MSET estimates and associated alerts for subset A (step 408). The system then determines the average alert count X for subset A (step 410). At the same time, the system trains an MSET model on subset A (step 412) and uses the trained MSET model to generate MSET estimates and associated alerts for subset B (step 414). The system then determines the average alert count Y for subset B (step 416).

Next, the system compares X and Y (step 418). If X is approximately equal to Y and this is the first run through the process, the system divides both subsets to form four subsets A1, A2, B1 and B2 (step 420). The system then returns to block 1 to repeat the process for subsets A1 and A2 and subsets B1 and B2 (step 422). On the other hand, if X is not approximately equal to Y and the number of subset divisions is less than a maximum number of subset divisions, the system selects the subset corresponding to the higher average alert count (step 424) and returns to step 404 to repeat the splitting and analyzing process. Finally, for all other cases at step 418, the system concatenates the clean subsets to form clean training data and the process is complete (step 426).

The operation of this new Monte Carlo simulation technique is illustrated in the following example. The example starts with a dataset comprising time-series signals received from a monitored asset. During the process of identifying anomalous sections of this dataset, the system first partitions the dataset in two sections: a first half (A) and a second half (B). Next, we train on A and test on B, and then train on B and test on A. The system then compiles associated anomaly tripping frequency counts and generates a chart. This chart indicates that when the system trains on B and tests on A, the tripping frequencies are minimal, whereas when the system trains on A and tests on B, the tripping frequencies are somewhat higher. In this example, it can be concluded that a potential anomaly is localized in B. FIGS. 6A-6E present graphs that illustrate the splitting, training and testing processes for halves of an exemplary dataset in which the second half of the data B is determined to include an anomaly.

Figure 7A:
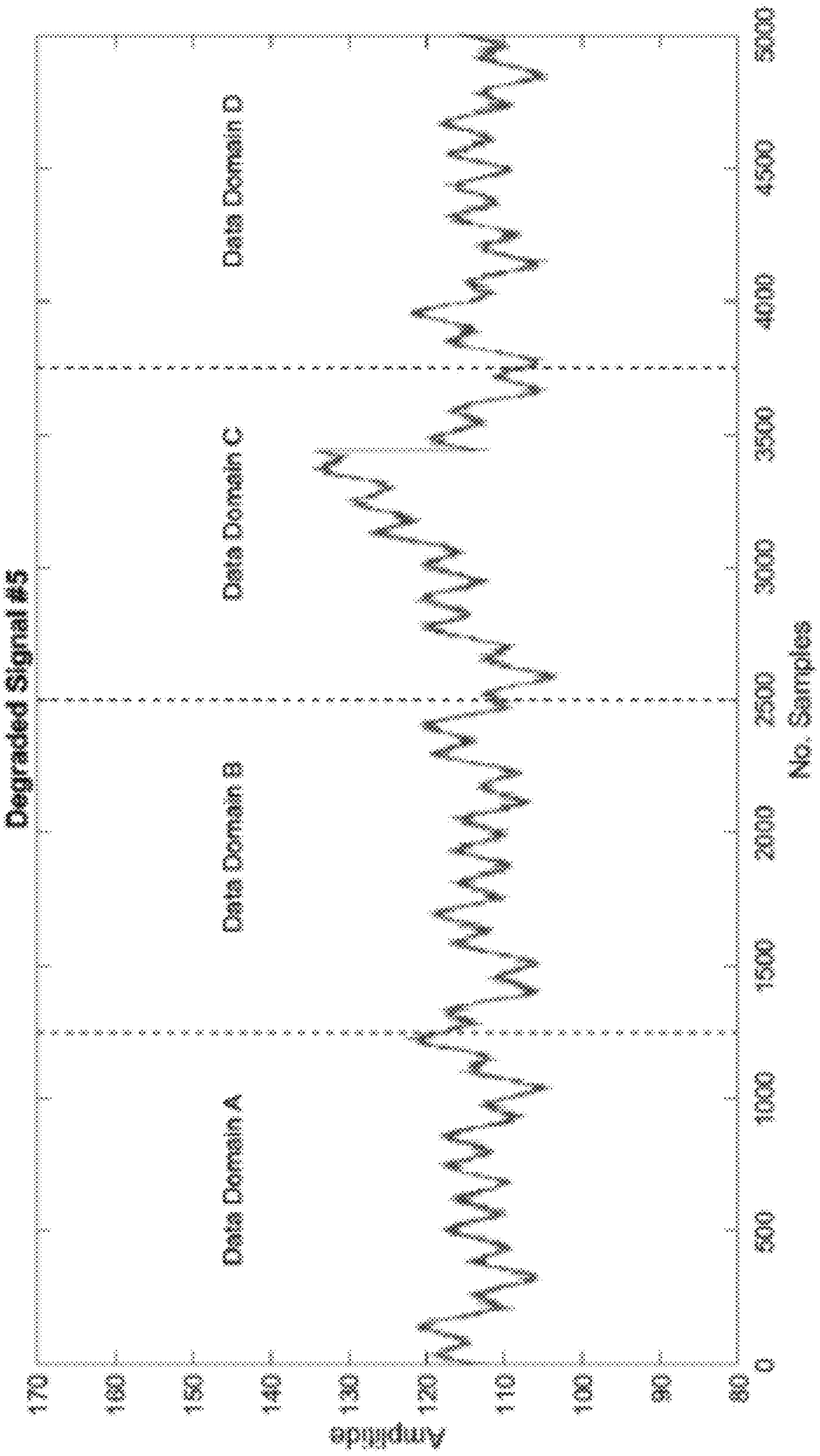
FIG. 7A presents a graph illustrating training data that is split into fourths in accordance with the disclosed embodiments.
Figure 7B:
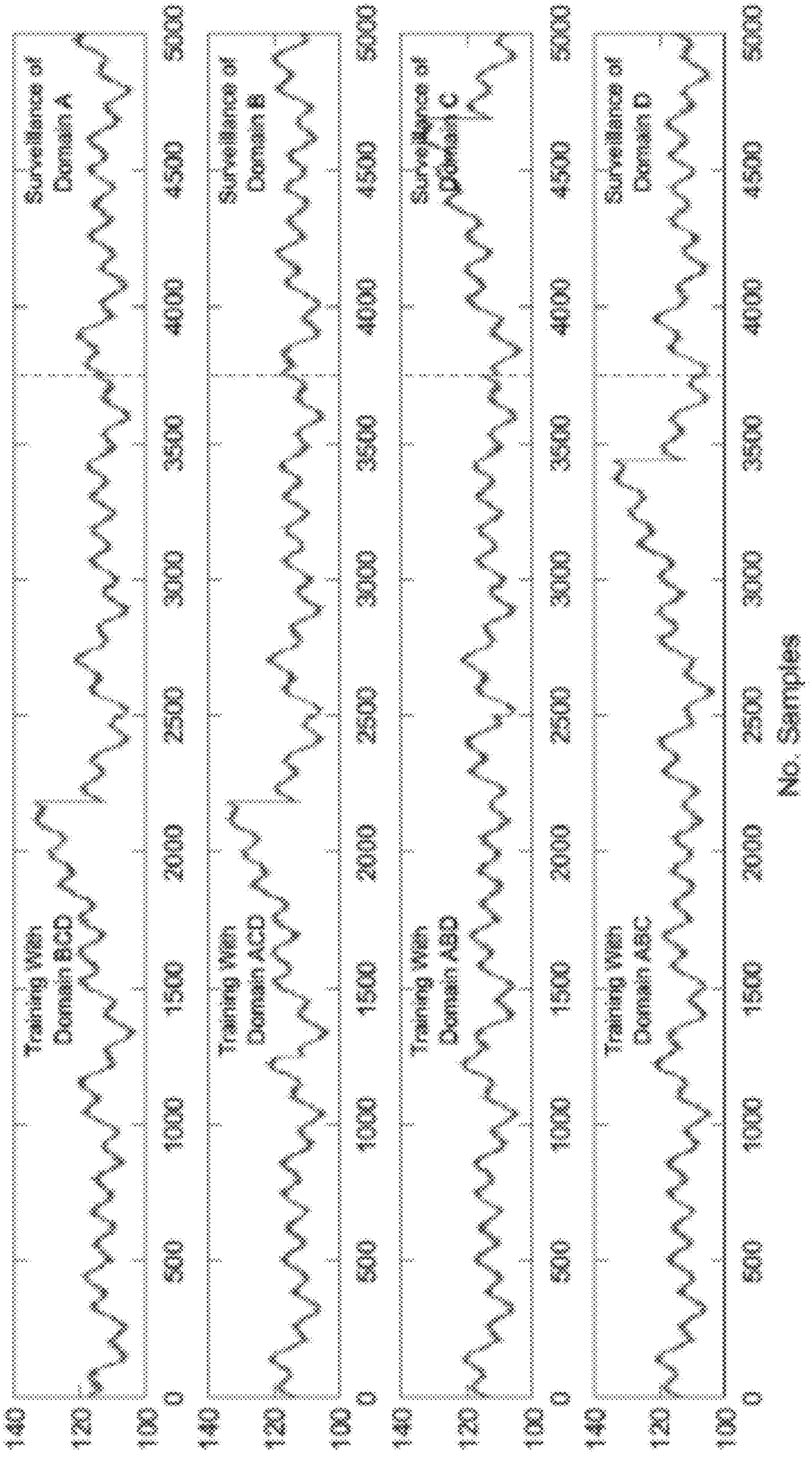
FIG. 7B presents graphs illustrating the training and surveillance processes for the training data that is split into fourths in accordance with the disclosed embodiments.
Figure 7C:
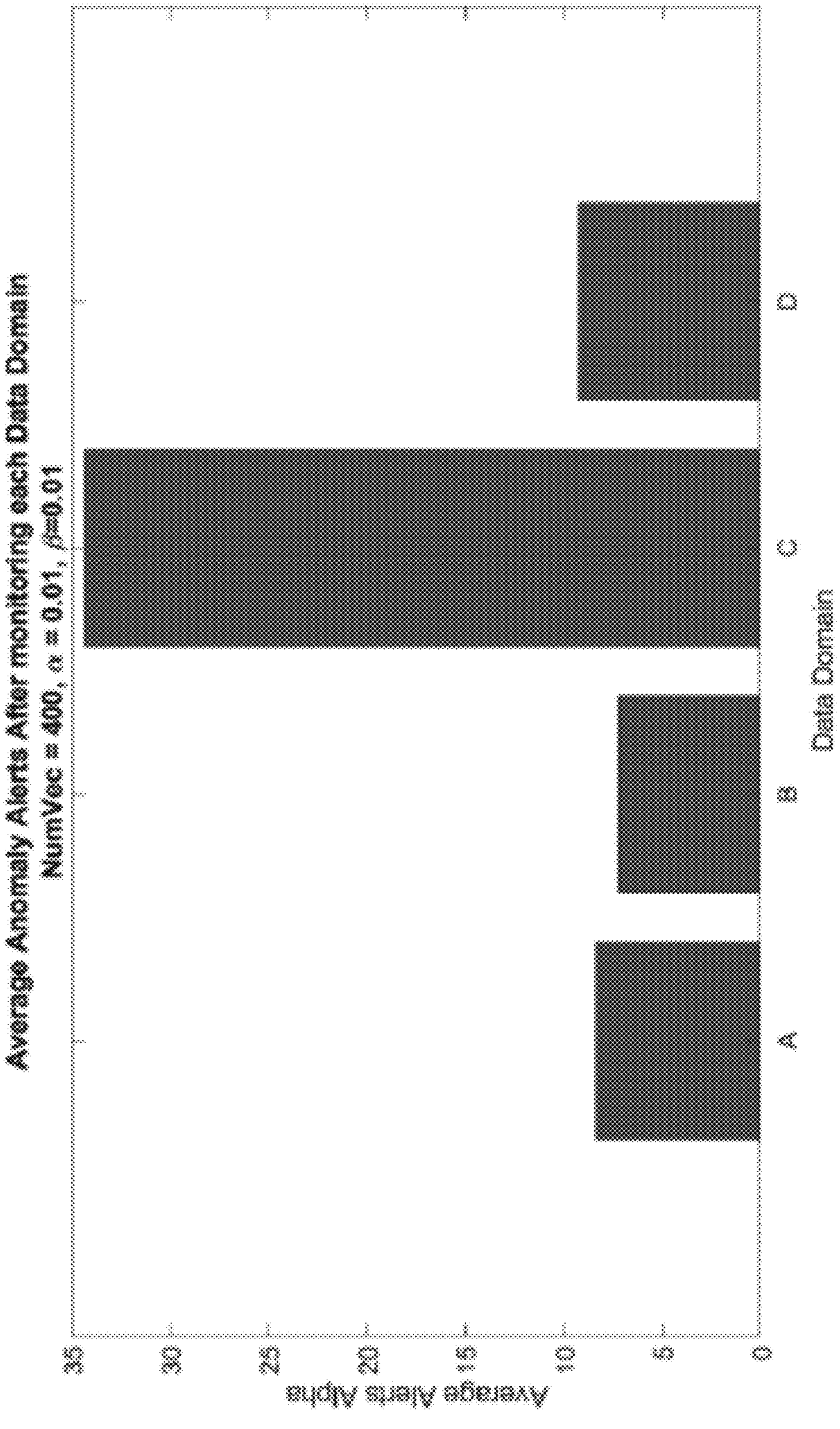
FIG. 7C presents a bar chart illustrating the average number of anomaly alerts for domains A, B, C and D in accordance with the disclosed embodiments.

In the next round, the dataset is split in four quarters A, B, C and D. Then: (1) the system trains on ABC and tests on D; (2) trains on ABD and tests on C; (3) trains on ACD and tests on B; and (4) trains on BCD and tests on A. The system again compiles the anomaly counts for the various permutations of training and testing. FIGS. 7A-7C present graphs that illustrate the splitting, training and testing processes for four quarters of an exemplary dataset in which the third quarter of the data C is determined to include an anomaly.

This procedure can be extended to splitting into eighths, and then sixteenths, and so on. However, before doing so, a number of issues have to be considered.

(1) For prior MSET anomalies, it is common to label SPRT alerts as false alarms or real alarms based on a root cause analysis of the assets, or based on ground truth knowledge about the telemetry database. However, in this procedure, regardless of whether the SPRT alerts are false or real, they are simply labeled as "anomaly alerts" and no attempt is made to determine whether they are false or real during the associated computations.

(2) Note that instead of starting with very coarse chunks of data (e.g., halves) and working down to fine slices, the system could simply start with fine slices, which will catch the narrowest inlier or outlier anomalies. However, by starting with coarse chunks (halves), it is possible that the first pass, which trains on A and tests on B, and trains on B and tests on A, will produce no anomaly alerts. In this case, it can be concluded with high confidence that there are no anomalies (outliers or inliers) existent in the telemetry data without the large computation costs involved in analyzing finer slices.

(3) Although executing the nested loop to analyze progressively finer slices can take a long time, this is not a significant problem because the analysis only needs to performed once for a new customer's use case. Moreover, the computational operations performed by our simulation framework are highly parallelizable. This means that the computational operations can be distributed across a large number of virtual machines or cores to achieve a significant speedup.

This new iterative technique has been demonstrated for exemplary use cases that proceed up to 16-way splits with all of the associated permutations and combinations. However, in general, the technique can be extended up to 32-way splits, 64-way splits, or any desired granularity without departing from the inventive concepts presented in this disclosure.

Process of Producing Synthetic Signals

Figure 5:
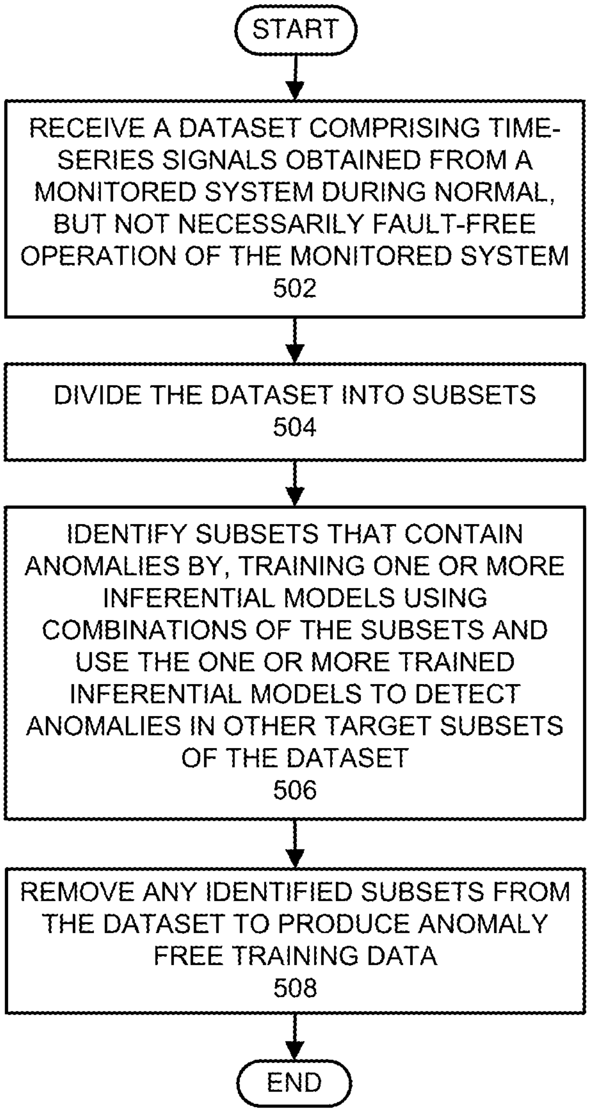
FIG. 5 presents a high-level flow chart illustrating the process of producing anomaly-free training data in accordance with the disclosed embodiments.
Figure 6A:
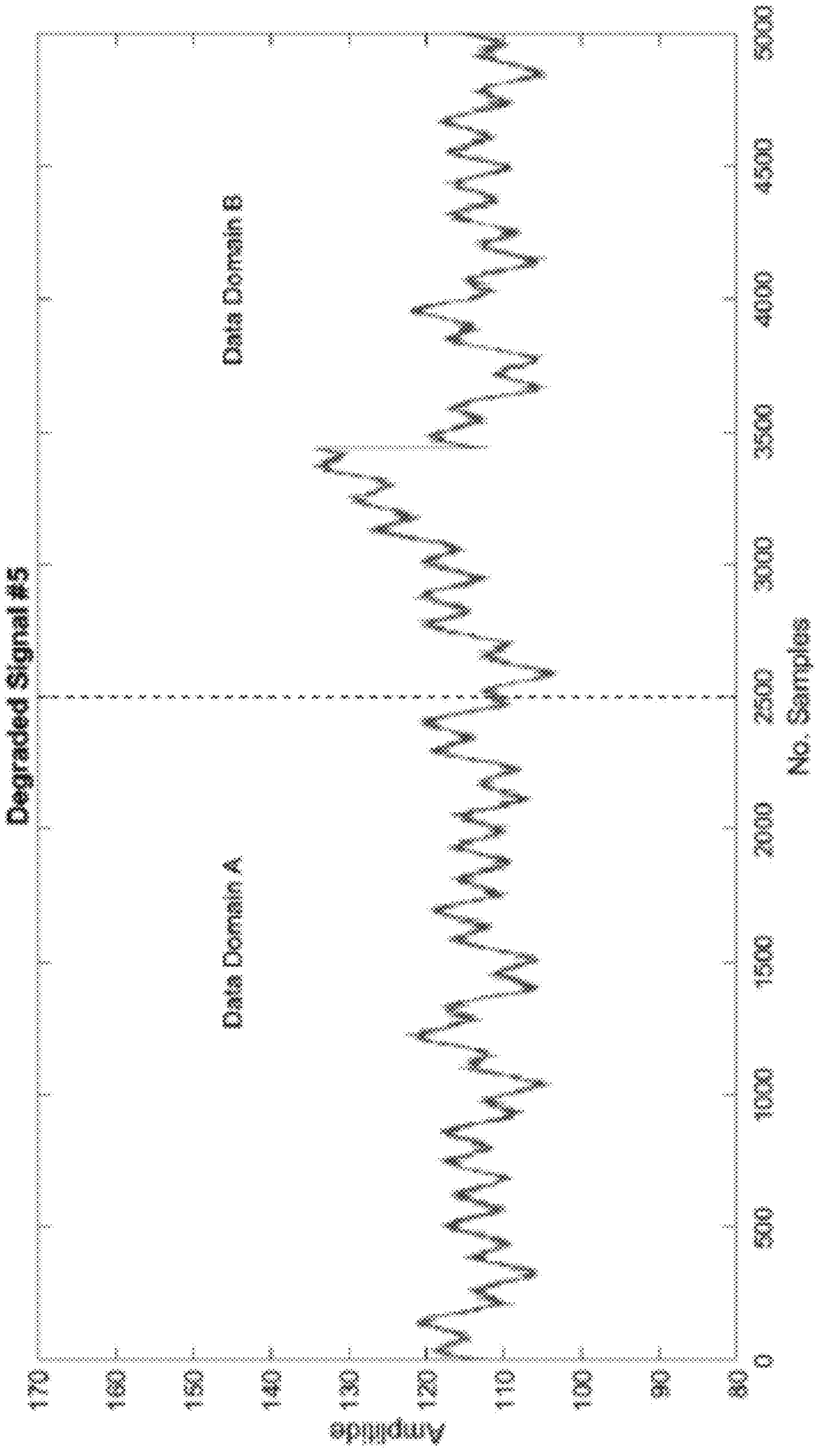
FIG. 6A presents a graph illustrating training data that is split into halves in accordance with the disclosed embodiments.
Figure 6B:
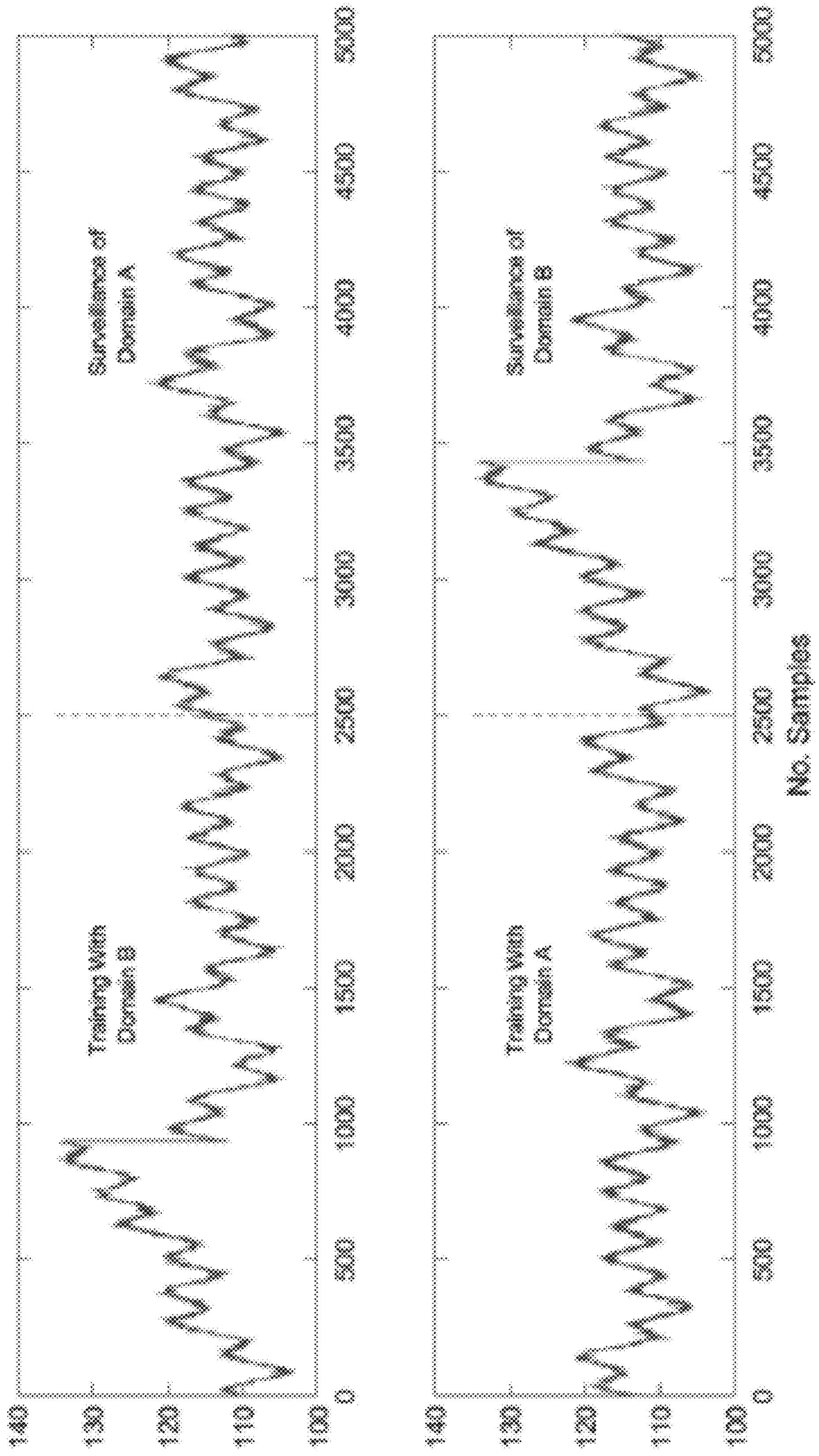
FIG. 6B presents graphs illustrating the training and surveillance processes for the training data that is split into halves in accordance with the disclosed embodiments.
Figure 6C:
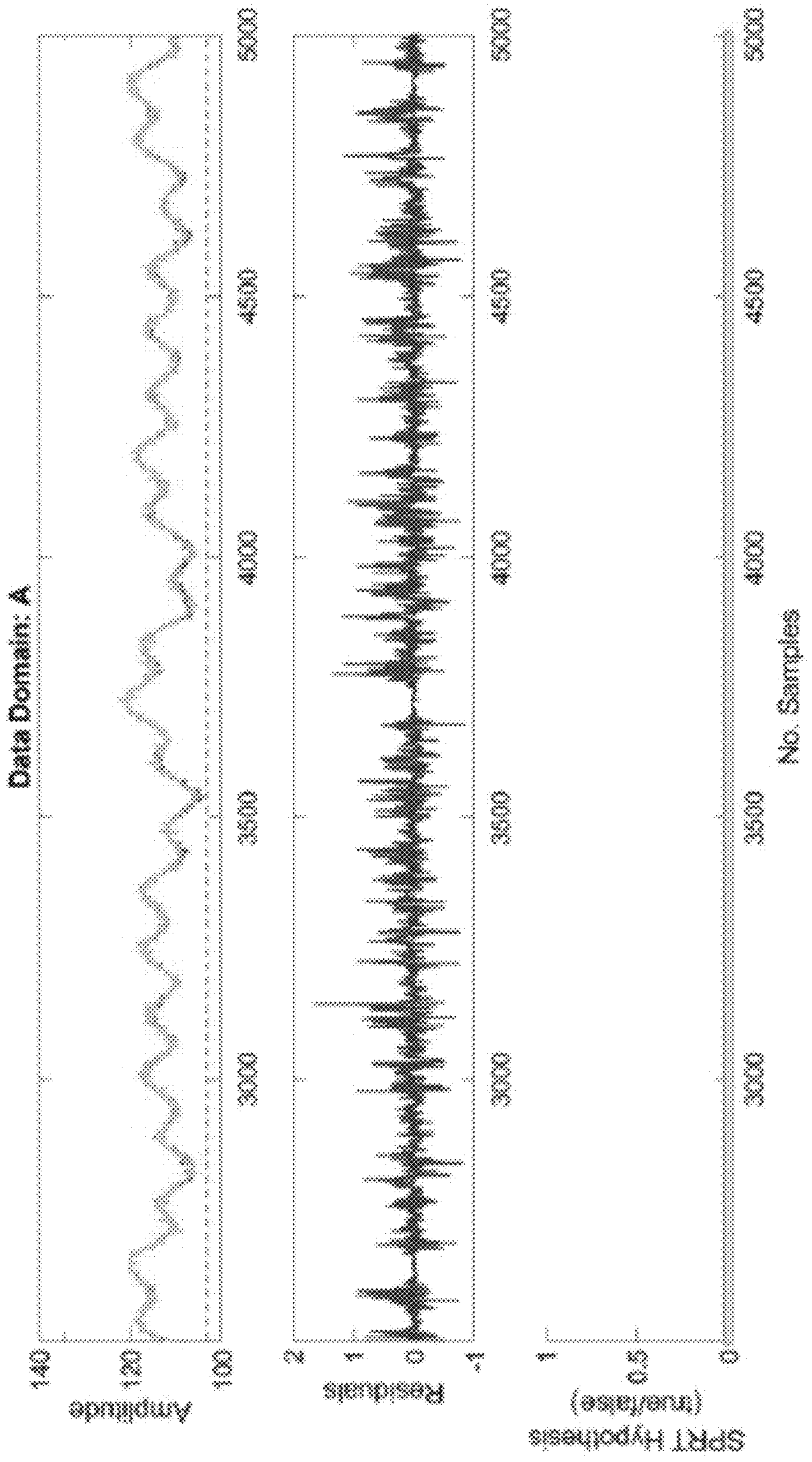
FIG. 6C presents graphs illustrating MSET results for domain A in accordance with the disclosed embodiments.
Figure 6D:
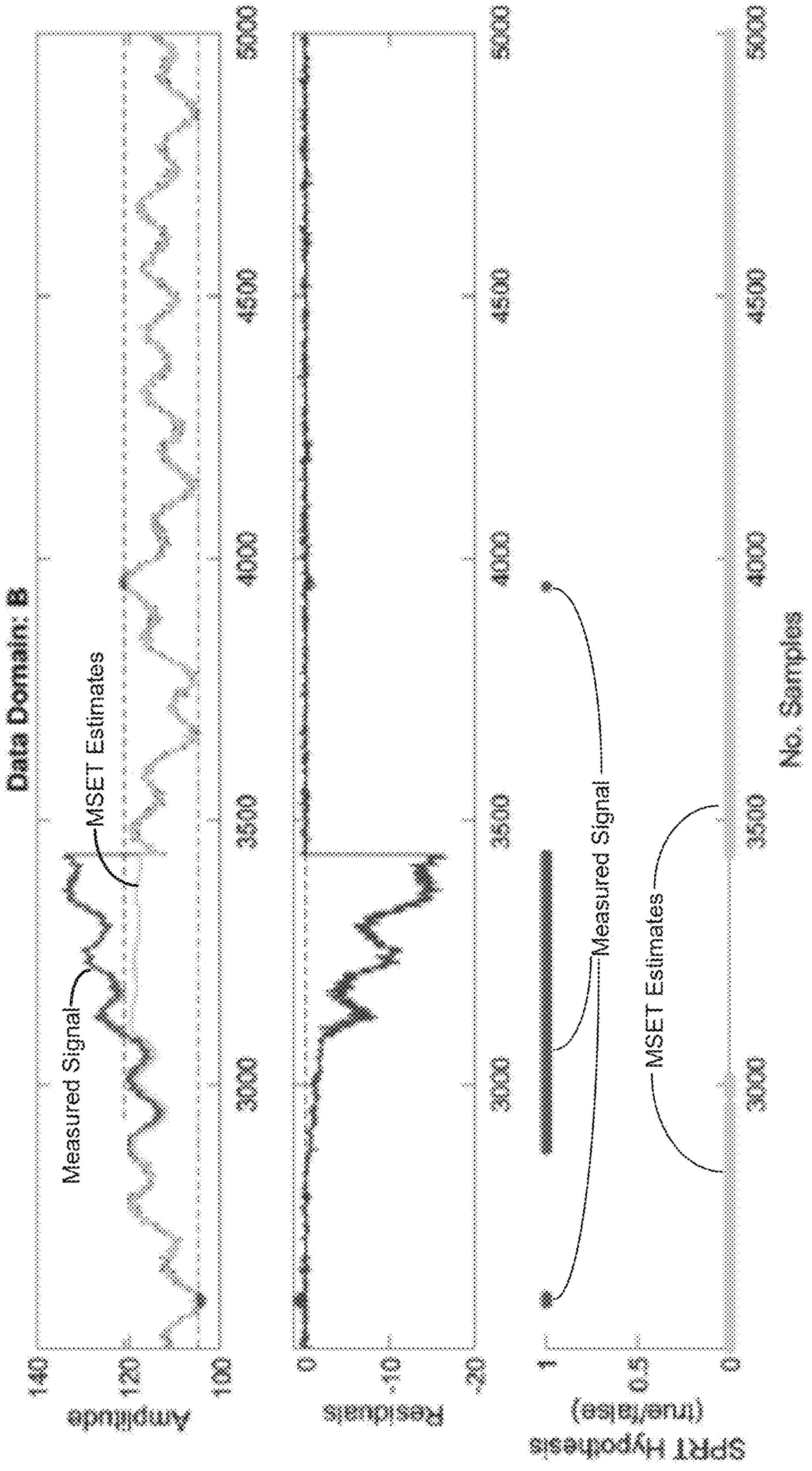
FIG. 6D presents graphs illustrating MSET results for domain B in accordance with the disclosed embodiments.
Figure 6E:
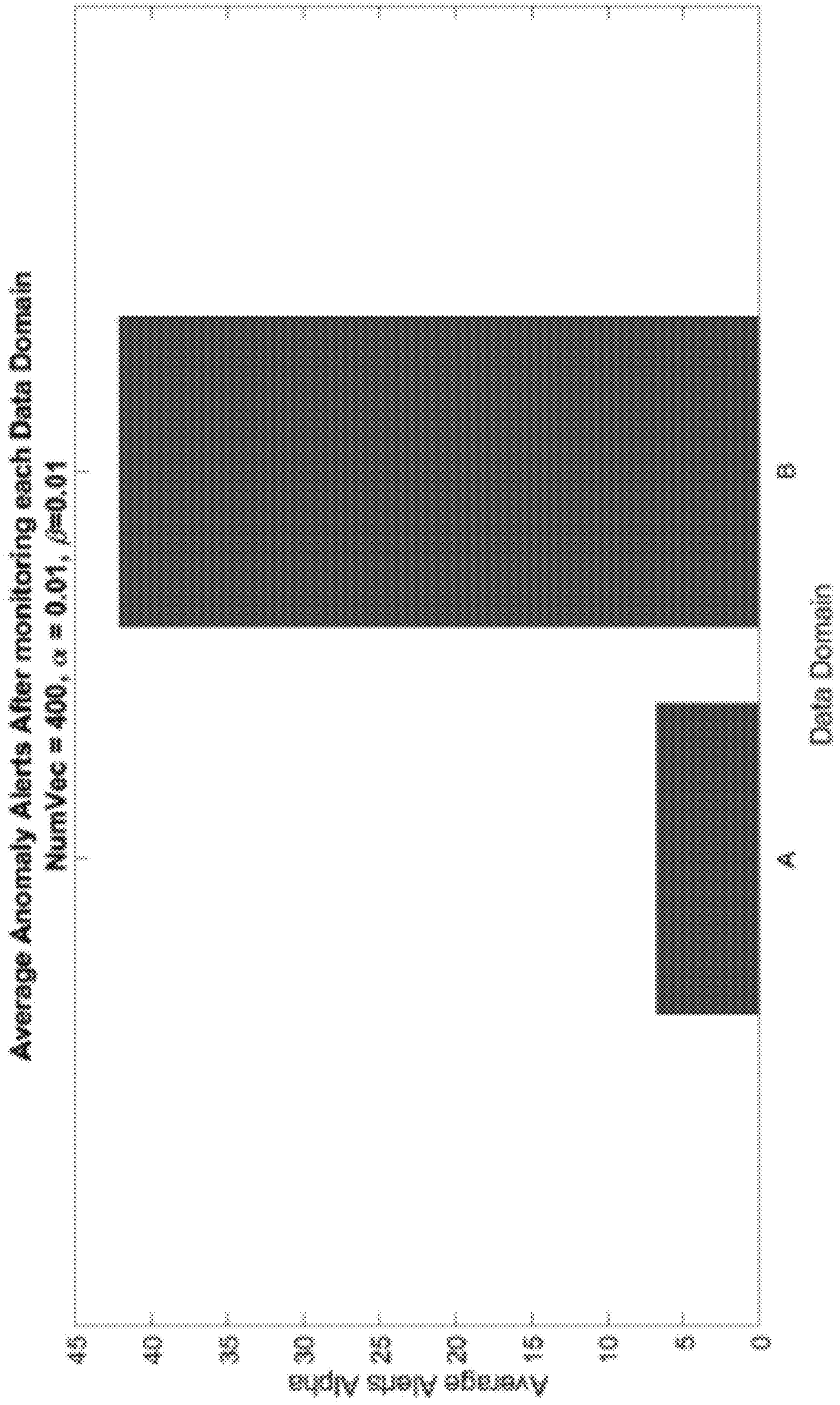
FIG. 6E presents a bar chart illustrating the average number of anomaly alerts for domains A and B in accordance with the disclosed embodiments.

FIG. 5 presents a high-level flow chart illustrating the process of producing anomaly-free training data to facilitate ML-based prognostic surveillance operations in accordance with the disclosed embodiments. During operation, the system receives a dataset comprising time-series signals obtained from a monitored system during normal, but not necessarily fault-free operation of the monitored system (step 502). Next, the system divides the dataset into subsets (step 504). The system then identifies subsets that contain anomalies by training one or more inferential models using combinations of the subsets, and using the one or more trained inferential models to detect anomalies in other target subsets of the dataset (step 506). Finally, the system removes any identified subsets from the dataset to produce anomaly-free training data (step 508).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for producing anomaly-free training data to facilitate machine learning (ML)-based prognostic surveillance operations, comprising:

receiving a dataset comprising time-series signals obtained from a monitored system during operation of the monitored system;

dividing the dataset into a plurality of subsets;

identifying subsets that contain anomalies from target subsets of the dataset by:

training one or more inferential models using combinations of subsets of the plurality of subsets, and using the one or more trained inferential models to detect anomalies in the target subsets of the dataset; and removing one or more subsets of the target subsets having the detected anomalies from the dataset, wherein the dividing the dataset into subsets and identifying the subsets that contain anomalies is an iterative process, which starts with fewer larger subsets and progresses to a larger number of smaller subsets.

2. The method of claim 1, wherein removing identified subsets from the dataset comprises:

confirming that the identified subsets contain anomalies; and removing the identified subsets that are confirmed to contain anomalies.

3. The method of claim 1, wherein training the one or more inferential models using combinations of the subsets comprises training an inferential model for every possible combination of the subsets.

4. The method of claim 1, wherein using the one or more trained inferential models to detect anomalies in the target subsets of the dataset comprises:

using the one or more trained inferential models to perform prognostic-surveillance operations on the target subsets; and identifying target subsets that contain anomalies based on a number of alerts produced during the prognostic-surveillance operations.

5. The method according to claim 1, wherein the identifying the subsets that contain anomalies from target subsets of the dataset, further comprises, prior to the training, receiving one or more of the subsets comprising anomalies and one or more of the subsets that do not contain anomalies.

6. The method of claim 1, wherein the method further comprises:

during a training mode, using the anomaly-free training data to train an inferential model; and during a surveillance mode, using a trained inferential model of the one or more trained inferential models to generate estimated values for the time-series signals received from the monitored system based on cross-correlations between the time-series signals, performing pairwise differencing operations between actual values and the estimated values for the time-series signals set to produce residuals, and analyzing the residuals to detect incipient anomalies in the monitored system.

7. The method of claim 6, wherein analyzing the residuals comprises:

performing a sequential probability ratio test (SPRT) on the residuals to produce SPRT alarms; and detecting the incipient anomalies based on the SPRT alarms.

8. The method of claim 1, wherein an inferential model of the one or more inferential models comprises a multivariate state estimation technique (MSET) model.

9. A non-transitory computer-readable storage medium storing instructions that when executed by a computer cause the computer to perform a method for producing anomaly-free training data to facilitate machine learning (ML)-based prognostic surveillance operations, the method comprising:

receiving a dataset comprising time-series signals obtained from a monitored system during operation of the monitored system;

dividing the dataset into a plurality of subsets;

identifying subsets that contain anomalies from target subsets of the dataset by:

training one or more inferential models using combinations of subsets of the plurality of subsets, and using the one or more trained inferential models to detect anomalies in target subsets of the dataset; and removing one or more subsets of the target subsets having the detected anomalies from the dataset, wherein the dividing the dataset into subsets and identifying the subsets that contain anomalies is an iterative process, which starts with fewer larger subsets and progresses to a larger number of smaller subsets.

10. The non-transitory computer-readable storage medium of claim 9, wherein removing identified subsets from the dataset comprises:

confirming that the identified subsets contain anomalies; and removing the identified subsets that are confirmed to contain anomalies.

11. The non-transitory computer-readable storage medium of claim 9, wherein training the one or more inferential models using combinations of the subsets comprises training an inferential model for every possible combination of the subsets, and wherein the inferential model of the one or more inferential models comprises a multivariate state estimation technique (MSET) model.

12. The non-transitory computer-readable storage medium of claim 9, wherein using the one or more trained inferential models to detect anomalies in the target subsets of the dataset comprises:

using the one or more trained inferential models to perform prognostic-surveillance operations on the target subsets; and identifying target subsets that contain anomalies based on a number of alerts produced during the prognostic-surveillance operations.

13. The non-transitory computer-readable storage medium of claim 9, wherein the method further comprises:

during a training mode, using the anomaly-free training data to train an inferential model; and during a surveillance mode, using a trained inferential model of the one or more trained inferential models to generate estimated values for the time-series signals received from the monitored system based on cross-correlations between the time-series signals, performing pairwise differencing operations between actual values and the estimated values for the time-series signals set to produce residuals, and analyzing the residuals to detect incipient anomalies in the monitored system.

14. The non-transitory computer-readable storage medium of claim 13, wherein analyzing the residuals comprises:

performing a sequential probability ratio test (SPRT) on the residuals to produce SPRT alarms; and detecting the incipient anomalies based on the SPRT alarms.

15. A system that produces anomaly-free training data to facilitate machine learning (ML)-based prognostic surveillance operations, comprising:

a computing system with one or more processors and one or more associated memories; and an execution mechanism that executes on the computing system, wherein during operation, the execution mechanism:

receives a dataset comprising time-series signals obtained from a monitored system during operation of the monitored system, divides the dataset into a plurality of subsets, identifies subsets that contain anomalies from target subsets of the dataset, wherein while identifying subsets that contain anomalies, the execution mechanism trains one or more inferential models using combinations of subsets of the plurality of subsets, and uses the one or more trained inferential models to detect anomalies in target subsets of the dataset, and removes one or more subsets of the target subsets having the detected anomalies from the dataset, wherein while dividing the dataset into subsets and identifying the subsets that contain anomalies, the execution mechanism performs an iterative process, which starts with fewer larger subsets and progresses to a larger number of smaller subsets.

16. The system of claim 15, wherein while removing identified subsets from the dataset, the execution mechanism:

confirming that the identified subsets contain anomalies; and removes the identified subsets that are confirmed to contain anomalies.

17. The system of claim 15, wherein while using the one or more trained inferential models to detect anomalies in the target subsets, the execution mechanism:

uses the one or more trained inferential models to perform prognostic-surveillance operations on the target subsets; and identifies target subsets that contain anomalies based on a number of alerts produced during the prognostic-surveillance operations.

* * * * *